United States Patent [19]

Skodlar

[11] Patent Number: 5,359,183

[45] Date of Patent: Oct. 25, 1994

[54] PAYMENT CARD WITH DISPLAY

[76] Inventor: Rafael Skodlar, 1585 Keesling Ave., San Jose, Calif. 95125

[21] Appl. No.: 864,217

[22] Filed: Apr. 6, 1992

[51] Int. Cl.$^5$ ............................................. G06K 19/06
[52] U.S. Cl. .................................. 235/493; 235/380; 40/449
[58] Field of Search ............... 235/493, 380; 340/763, 340/764, 783, 787, 788; 40/449; 358/231

[56] References Cited

U.S. PATENT DOCUMENTS

| | | | |
|---|---|---|---|
| 3,812,490 | 5/1974 | Goodrich | 340/788 |
| 3,863,249 | 1/1975 | Olah | 340/788 |
| 3,935,571 | 1/1976 | Sargent | 340/788 |
| 4,288,936 | 9/1981 | Okutsu | 40/449 |
| 4,450,440 | 5/1984 | White | 340/787 |
| 4,536,428 | 8/1985 | Murata | 40/449 |
| 4,675,476 | 6/1987 | Kobayashi | 40/449 |
| 4,831,372 | 5/1989 | Riddoch | 340/788 |
| 5,055,662 | 10/1991 | Hasegawa | 235/487 |
| 5,192,947 | 2/1993 | Neustein | 235/380 |

FOREIGN PATENT DOCUMENTS

| | | | |
|---|---|---|---|
| 810324 | 4/1969 | Canada | 40/449 |
| 0460891 | 2/1992 | Japan | 235/384 |

OTHER PUBLICATIONS

IBM Technical Disclosure Bulletin, "Credit Card with an Erasable Field for Human Readability" R. M. Ross vol. 8, No. 11. Apr. 1966.

Primary Examiner—E. Rollins Cross
Assistant Examiner—Erick Solis
Attorney, Agent, or Firm—Paul F. Schenck

[57] ABSTRACT

A new type of payment card includes a magnetically controlled display for visually reading magnetically recorded information such as current balance or available service value of the payment card. The required electronic and mechanical interface can be added to existing payment card handling equipment.

11 Claims, 6 Drawing Sheets

PAYMENT CARD WITH DISPLAY

BACKGROUND OF THE INVENTION

The present invention generally relates to plastic payment cards for copy machines, telephones, parking and passenger tickets, credit cards, electronic games, bank teller machines, social services payment card, hotel services payment card, laundry machines, vending, gambling machines and other application in which the user would like to know or should always know the balance of the value still available for use. Present cards use a magnetic stripe to record the balance of money after the purchase from the vending machine or after the last financial transaction. Some vending machines allow to read the balance prior to use. In many applications users find these cards inconvenient to use since there is no visual record on the card of the latest transaction or the current balance of the card.

PRIOR ART

'Plastic' cards with one or more magnetic stripes are used for recording of financial transactions or identification of the user of services. Typically, these cards are made of plastic material less than 1 mm thick, 85 mm long and 54 mm wide, 'Plastic' money cards replace coins, tokens and paper money and thus eliminate the need to carry exact change for services. These cards have no means for recording of a transaction information in a human readable form.

DESCRIPTION OF THE INVENTION

Object of this invention is to provide means for recording human readable information on special areas of plastic money cards, credit cards and smart cards used in vending and automatic teller machines.

It is another object of the invention to provide means for erasing human readable magnetically recorded information and writing new human readable magnetically recorded information on the same special area of cards.

A thin layer of magnetic display film, which changes the light reflection property between more and less light reflective state upon application of suitable magnetic field, is embedded in a plastic card. When the card is inserted in a machine control device or the like an electromagnet changes the magnetic film and thus its light reflection property. The recorded information is stored until it is changes by application of a different magnetic field.

In the machine control device electromagnets comprise the write/erase head. When the card positioning mechanism moves the magnetic display film of the card under the write/erase head, the energized write/erase head erases the present contents and records new information on the magnetic display film. The simplest write/erase head consists of one electromagnet for the write and one electromagnet for the erase function. Such a head could record distinctive reflective states on different parts of the magnetic display film by changing the reflective states in patterns according to the value to be recorded. Portions of the film may be designated for different amounts of monetary unit and fractions of it. For example: combinations of dots for 1, 2, 5, and 10 with fractions of 0.05, 0.1, 0.2, 0.5, could make up to 20.00. In case where absolute accuracy is not required, a bargraph recording would be implemented. A preprinted scale would serve as a reference to the recorded length of the bar on the magnetic display film. The length of the bar would be in proportion with the value recorded on the magnetic display film.

Write/erase head of more complexity would comprise 5 electromagnets with U and I shaped cores for write function and one electromagnet with core for the erase function. A write portion of the write/erase head would record numbers in human readable seven segment shapes.

Another yet more complex write/erase head would comprise 7 or more electromagnets and one elongated shape erase electromagnet. Write electromagnets would be assembled in a column so that when energized they would form a matrix pattern of shapes on a magnetic film when the card would move under the head. Using such an improved write/erase head, characters of different alphabets and graphic symbols could be formed on the magnetic film.

It is still another object of this invention to provide for a new type of plastic payment card which in combination with a new type of teller machine could simplify the distribution of monetary funds to large groups people, simplify the process of the payment process and the use of features in amusement parks.

The preferred embodiment of the payment card described herein comprises a plastic card or the like including embossed information, a magnetic stripe for storing information and having embedded a thin magnetic field sensitive film which can be read by visual inspection. The apparatus for handling the payment card includes a write/erase head for the magnetic film, a microcontroller, a display, card position control with position sensors, a read/write head (R/W head hereafter) for magnetic stripe to store data, keyboard and the hard handling mechanism with sensors. Existing vending machines, service counter equipment and cash registers could easily be upgraded with this invention and thus make the plastic payment cards more acceptable to the public.

The directly readable information stored in the embedded magnetic film contains information on the service one can obtain using the card. This value may be expressed in a numerical dollar value, a bargraph representation of the value, the number of time the card may be used before new authorization or entitlement has to be acquired. To visually readable redeemable service value may be coded or may be made unreadable unless a certain status is reached. Such a status may be a minimum value before exhaustion of the useable value. Such a procedure has to be followed by the control processor handling the payment card during a transaction. The display of the value under a set limit just makes the user aware that action has to be taken to increase the potential transaction value in applications were it is not desired to disclose the actual useable transaction value. The minimum value may be programmed on the normal magnetic strip whenever the potential transaction value of the payment card is increased. The processor of the service machine can read that information and activate the magnetic display film accordingly.

DESCRIPTION OF THE PREFERRED EMBODIMENT

Figure 1:
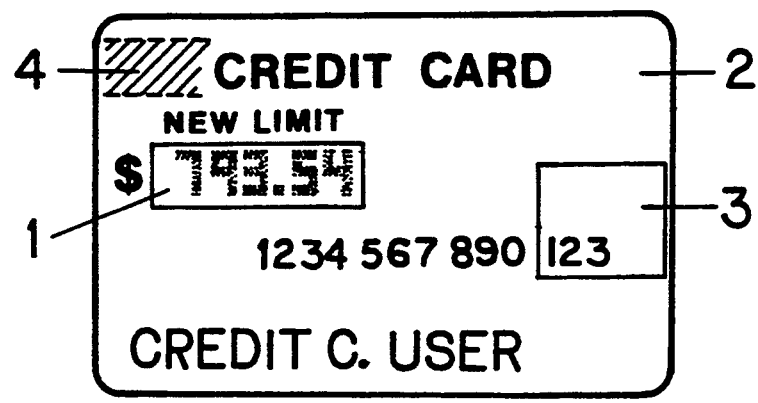
FIG. 1 is a view of a credit card with a magnetic film in the middle of its left side.

FIG. 1 is an illustration of a typical credit card 2 with the magnetic display film 1, hologram picture 3 on its front side and magnetic stripe 4 on the back. Magnetic display film 1 is positioned so that it does not overlap with magnetic stripe 4.

Figure 2:
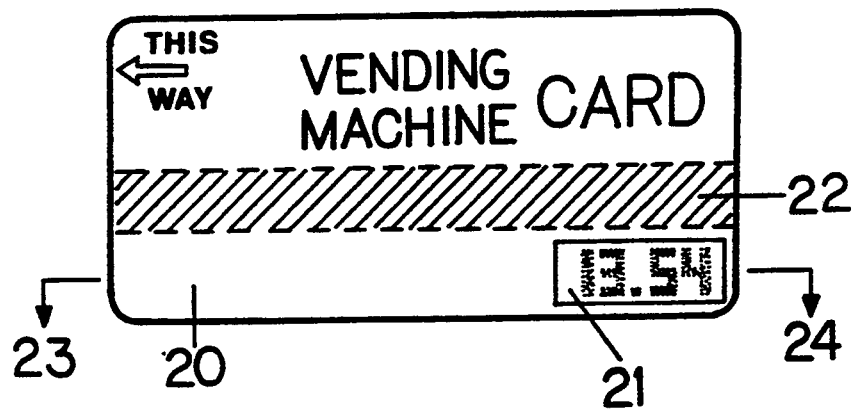
FIG. 2 is a view of a plastic payment card with a magnetic display film in the lower right hand corner.
Figure 3:
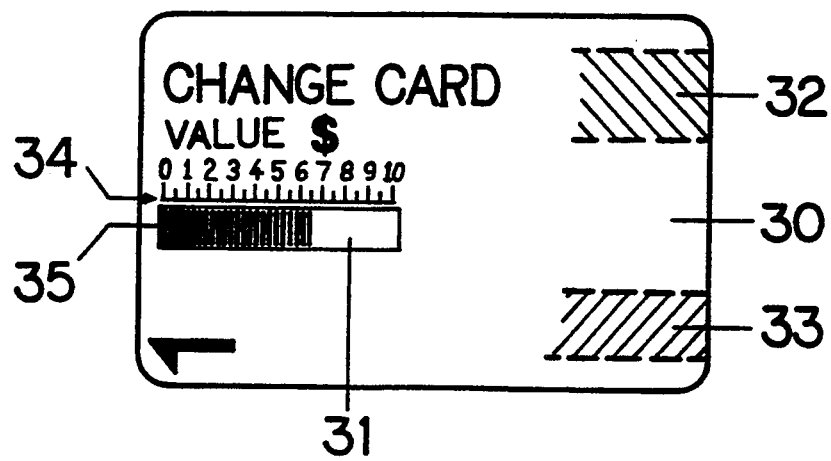
FIG. 3 is a view of a plastic payment card with multiple magnetic stripes and magnetic display film.

FIG. 2 is a front view of the plastic money card 20 with a magnetic display film 21 in the lower right corner on the front side. Magnetic display film 21 is positioned so that it does not overlap the magnetic stripe 22 on the back of the card. FIG. 3 is an illustration of a plastic payment card 30 with magnetic display film 31 on the front side, and multiple magnetic stripes 32 and 33 on the back side. Magnetic display film 31 is positioned in the middle between stripes 32 and 33 so that it does not overlap them. Scale 34 is a reference for the recorded value in bargraph format. For example, bar 35 represents recorded value of about $6.5O on scale between 0 and 10.

The recorded information, credit or monetary amount is easily readable on the magnetic display films of the plastic cards shown on FIGS. 1, 2, and 3.

In all three cases above, the position of erase/write head 60 (see FIG. 6a) in teller or vending machines or the like is such that permanent magnetism does not destroy magnetic recordings on magnetic stripes 4, 22, 32, and 33 accidentally if cards 2, 20, and 30 are inserted improperly.

Figure 4:
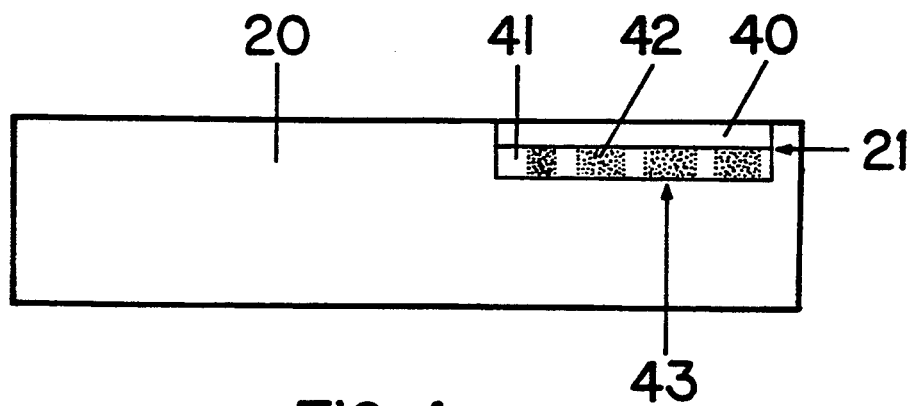
FIG. 4 is a cross-sectional view 23-24 of a plastic payment card of FIG. 2 with a magnetic display film embedded in it.

FIG. 4 is a magnified view of a cross-section of a plastic payment card 20 (see FIG. 2). Plastic card 20 has a magnetic display film 21 embedded in it. Magnetic film 21 comprises a Mylar film 40 coated with microscopic magnets 41 encapsulated in oil bubbles where they float freely. Tiny bubbles are molded on a film 40 typically 0.15 mm (0.006") thick. When the information is written into the magnetic film 21, tiny magnets 41 align themselves with the magnetic lines of force. This action affects the way the light is reflecting from the aligned tiny magnets therefore changing the color or intensity of the reflected light. In FIG. 4 groups of tiny magnets 42 and 41 had previously been aligned by magnetic force and therefore reflect the light differently. Background area 43 between card 20 and magnetic film 21 is colored in contrast to the color of tiny magnets 41 and 42 for a better reading.

Figure 5:
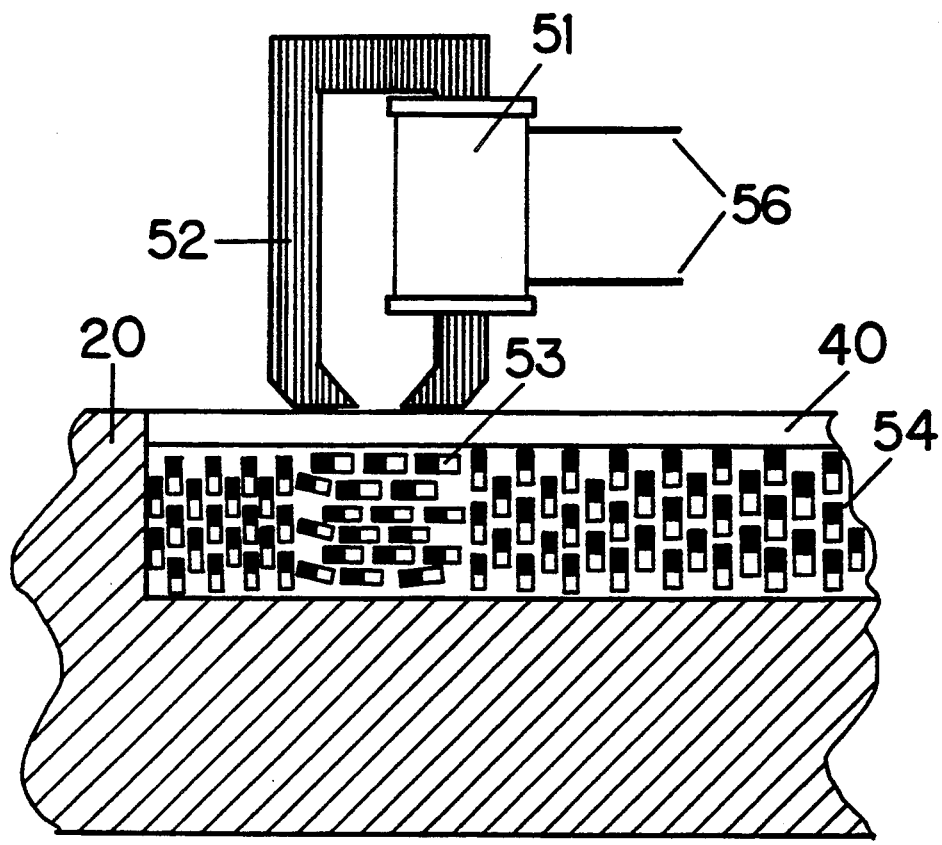
FIG. 5 is a cross-section of a plastic payment card with embedded magnetic display film and a section of the energized write/erase head influencing orientation of tiny magnets.
Figure 9:
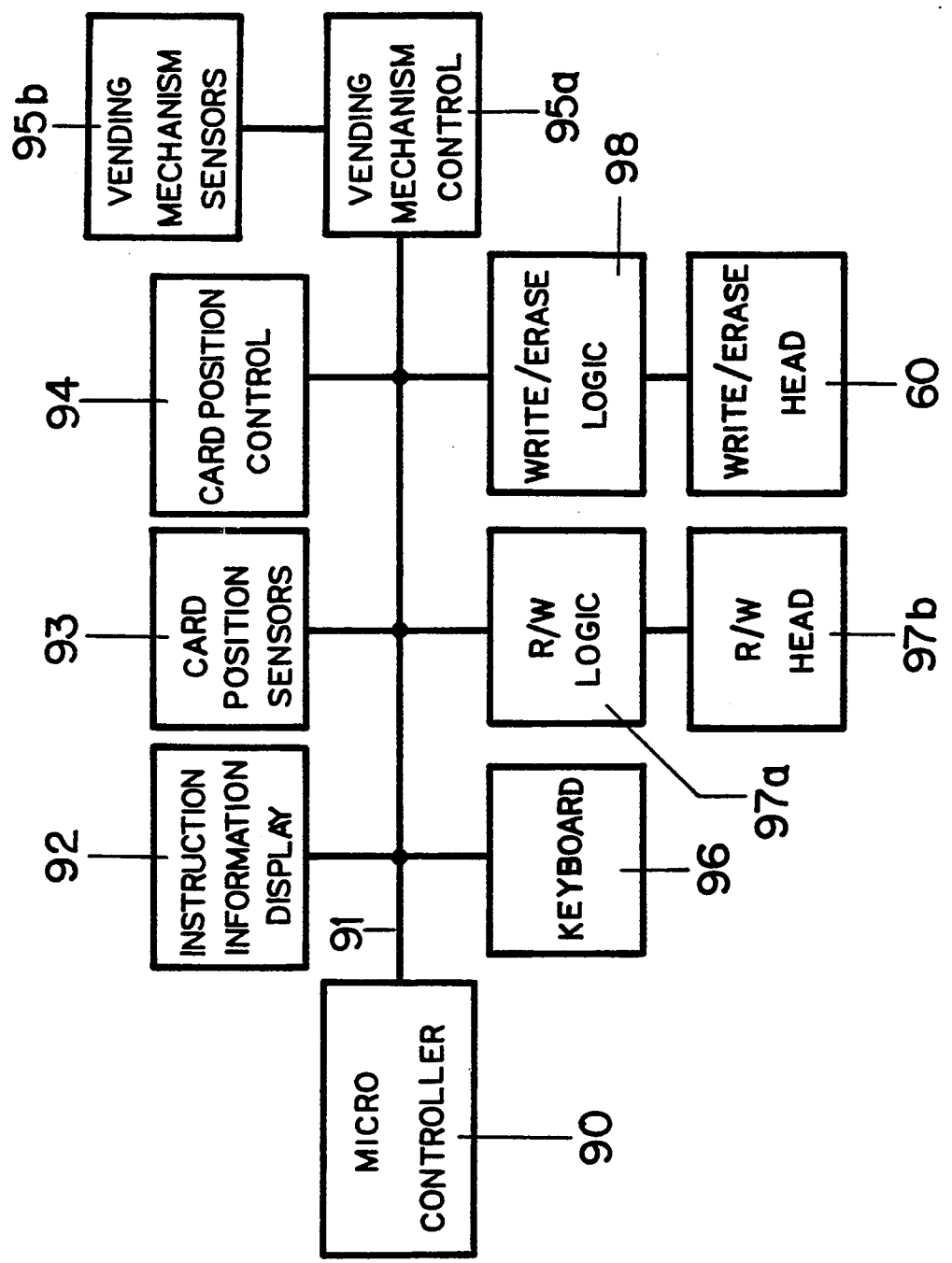
FIG. 9 is a block diagram of the logic blocks that control the positioning of the plastic payment card, write, erase, and read functions together with functional parts of existing vending machine.

FIG. 5 is a cross-sectional illustration of an electromagnet comprised of coil 51, core 52 and lead wires 56. Mylar film 40 with tiny magnets 53 and 54 is embedded in a plastic payment card 20. Coil 51 is connected to wires 56 to write/erase logic 98 (FIG. 9). Prior to recording the erase electromagnet of write/erase head orients all tiny magnets in one direction (erase direction). The magnetic field from the coil 51 through core 52 aligns tiny magnets 53 in the immediate area under the core 52 from their erase direction. Light reflection from the magnets 53 is different from the magnets 54 therefore leaving a human readable record on the magnetic film.

Figure 6A:
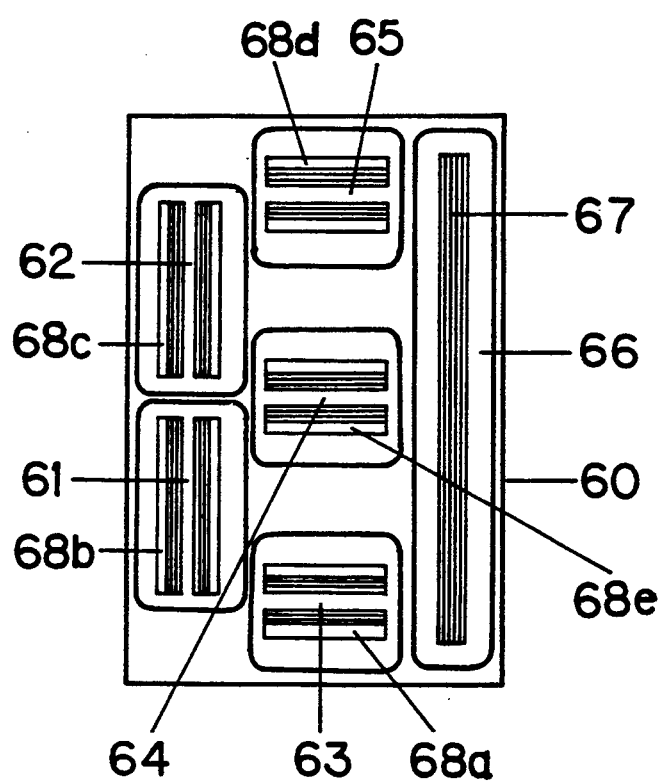
FIG. 6a is an illustration of the work area of the write/erase head.

In FIG. 6a head 60 comprises five write electromagnets 61, 62, 63, 64, 65, with their respective cores 68c, 68b, 68d, 68e, and 68a, and one erase electromagnet 66. Write electromagnets with their cores 68a, 68b, 68c, 68d, and 68e form five segments in an 'E' like arrangement so that a specific pattern is formed when the controlled electric current is applied to them. As the card mechanism moves a card as card 20 of FIG. 2 with magnetic display film 21 under write/erase head 60, the magnetic field from the energized write or erase electromagnets affect orientation of tiny magnets. In a first operation magnetic stripe 4 is read to verify the card while magnetic film 21 is erased for subsequent write. In the following operation the information is simultaneously written to magnetic display film 21 with the write/erase head 60 and to magnetic stripe 22 with the R/W head 97b (see FIG. 9).

Figure 6B:
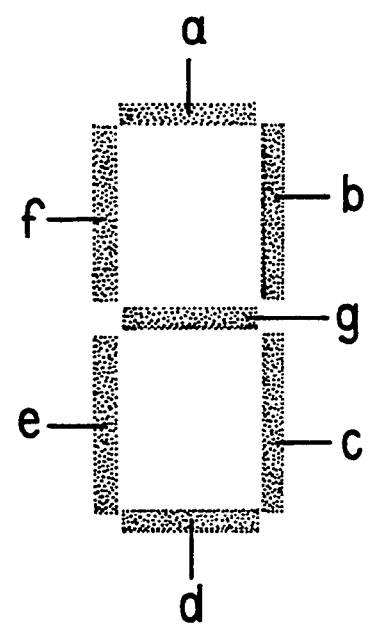
FIG. 6b is an illustration of a seven segment numerical character eight.

FIG. 6b shows a seven segment display pattern forming number 'eight' shape with its commonly accepted segment designations a, b, c, d, e, f, and g. A character is written on magnetic display film 21 in 2 time instances whereby a time instance is a step or time period during continuous motion of the card. In the first time instance segments a, d, e, f, and g are written with their corresponding electromagnets 63, 65, 62, 61, 64. In the second time instance segments b and c are written with electromagnets 61 and 62. The described process is repeated for each character position subsequently as many times as needed.

Figure 7:
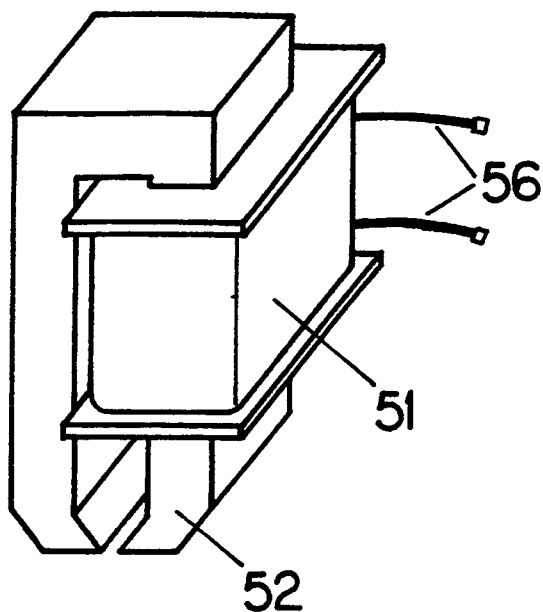
FIG. 7 is a perspective view of the write section of the write/erase head.

FIG. 7 Is a perspective view of a U-shaped write electromagnet such as electromagnet 61 in FIG. 6a. It comprises coil 51, ferrous core 52, and coil connecting leads 56.

Figure 8:
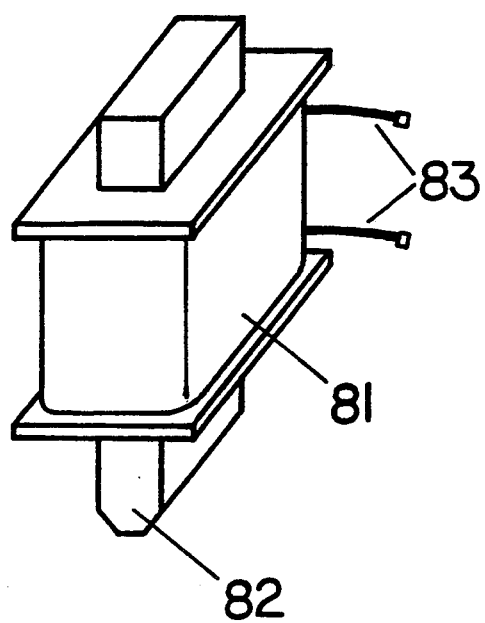
FIG. 8 is a perspective view of the erase section of the write/erase head.

FIG. 8 is a perspective view of an I-shaped erase electromagnet such as electromagnet 66 from FIG. 6a with erase coil 81, ferrous core 82, and coil connecting leads 83.

FIG. 9 is a block diagram of the electronic control circuit comprising microcontroller 100 (such as microcontroller 8051 from Intel, or microcontroller 6811 from Motorola respectively) which executes the microcode for interaction between the peripherals on data and control bus 91. Display 92 (such as a 1 line by 20 characters LCD, or a gas plasma display) instructs the user for necessary steps and shows the status after the action. Card position sensors 93 sense the presence of the card and interrupt microcontroller 90 which takes appropriate action. If the card is properly inserted into a vending machine it is moved by card position mechanism 94. Microcontroller 90 reads magnetic stripe 21 (FIG. 2) using R/W logic 97a and read/write head 97b. Microcontroller 90 also sends the command to write/erase logic 98 which energizes electromagnet 66 in write/erase head 60 to magnetically erase magnetic display film 21 by uniformly aligning all tiny magnets. The user directs an action through the keyboard or push buttons 96, receives the merchandise from dispensing mechanism 95b driven by dispenser control 95a. The microcontroller 90 puts a status report on the display 92. After the service is completed, microcontroller 90 gives command to the card position control 94 to move the card. While the payment card moves a new monetary value is written with R/W head 97b on the magnetic stripe 22 (FIG. 2) while write/erase head 60 makes a new human readable record on the magnetic display film 21. The card is then released for pick up by the user.

In the above preferred embodiment the magnetic stripe for recording data and the magnetic display film are separated and perform different functions, store functional control data and store direct readable balance information, respectively. It is considered to be within the scope of the artisan skilled in the art to combine the two magnetic storage into one storage having a magnetically readable and writable capability and having a direct readable capability as disclosed in the above preferred embodiment.

What I claim is:

1. A payment card for enabling the operation of vending machines by a user, comprising:
a substantially rectangular flat card including first magnetic data storage means for storing information including value data including a first value, and means for displaying said first value; said first value representing an operating limit for said vending machines, said means for displaying said first value including a magnetically controllable nonvolatile display storage means having a transparent front window and an opaque background, said display storage means being controllable by externally applied magnetic fields for replacing said first value with a second value.

2. A payment card as claimed in claim 1, said display means includes suspended magnetic particles of a first color and a background of a second color contrasting with said first color.

3. A payment card as claimed in claim 2, wherein said particles when subjected to a magnetic field will assume one of two preferred states, wherein said particles in a first of said two states provide an image in said first color, and in a second state provide an image in said second color; the combination of said images representing said readable value data.

4. A payment card as claimed in claim 3, wherein said magnetic particles are magnetized in patterns in said first color representing said data value.

5. A payment card as claimed in claim 3, wherein said magnetic particles are magnetized in elongated patterns in said first color, said elongated pattern having a length representing said data value.

6. A payment card as claimed in claim 5, wherein said card includes a scale located along said transparent front window for scaling said displayed elongated pattern.

7. An apparatus for handling flat payment cards with visual value display means, said flat payment cards having first and second extensions and including first storage means for storing information, said apparatus comprising payment card handling means magnetic read/write means for reading information from said storage means and recording information in said storage means; magnetic erase/write means for erasing value data stored and displayed in said display means and recording value data in said display means.

8. An apparatus as claimed in claim 7 wherein said erase/write means include means for simultaneously storing pattern segments in said display means and said information in said first storage means.

9. An apparatus as claimed in claim 7 including control means for coordinating movement of said payment card with sequentially recording said data value in said display means.

10. An apparatus as claimed in claim 7 wherein said erase/write means include a plurality of first magnetic means arranged in a predetermined arrangement; said apparatus further including first control means for activating selected ones of said first magnetic means; said activated first magnetic means causing said display means to store and display said data value.

11. An apparatus for handling flat payment cards with visual value display means, said flat payment cards having first and second extensions and including storage means for storing information, said apparatus comprising payment card handling means magnetic read/write means for reading information from said storage means and recording information in said storage means; magnetic erase/write means for successively erasing value data stored and displayed in said display means, and recording value data in said display means; wherein said erase/write means include a plurality of first magnetic means arranged in a predetermined arrangement; said apparatus further including control means for advancing said payment card in a direction of said first or second extension for successively writing adjacent pattern segments to said display means; the combination of said pattern segments constituting a display pattern representing said data value.

* * * * *